US009686239B2

(12) United States Patent
Toubiana et al.

(10) Patent No.: US 9,686,239 B2
(45) Date of Patent: Jun. 20, 2017

(54) SECURE DATA TRANSMISSION

(71) Applicant: Alcatel Lucent, Boulogne Billancourt (FR)

(72) Inventors: Vincent Toubiana, Paris (FR); Serge Papillon, Nozay (FR)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/364,605

(22) PCT Filed: Dec. 24, 2012

(86) PCT No.: PCT/EP2012/076865
§ 371 (c)(1),
(2) Date: Jun. 11, 2014

(87) PCT Pub. No.: WO2013/102596
PCT Pub. Date: Jul. 11, 2013

(65) Prior Publication Data
US 2014/0366152 A1    Dec. 11, 2014

(30) Foreign Application Priority Data
Jan. 3, 2012 (FR) .................................... 12 50043

(51) Int. Cl.
*H04L 29/06* (2006.01)
*H04L 29/08* (2006.01)
(Continued)

(52) U.S. Cl.
CPC ............ *H04L 63/04* (2013.01); *H04L 12/287* (2013.01); *H04L 12/2854* (2013.01);
(Continued)

(58) Field of Classification Search
CPC .......... G06F 21/60; G06F 21/10; G06F 21/62; G06F 17/30864; H04L 67/10
See application file for complete search history.

(56) References Cited

U.S. PATENT DOCUMENTS

| 6,178,454 B1* | 1/2001 | Tsuneyoshi | G06Q 20/12 709/217 |
| 6,691,070 B1* | 2/2004 | Williams | G06F 11/3688 702/184 |

(Continued)

FOREIGN PATENT DOCUMENTS

| DE | 10150082 | 4/2003 |
| EP | 0889620 | 1/1999 |

(Continued)

*Primary Examiner* — Yonas Bayou
(74) *Attorney, Agent, or Firm* — Patti & Malvone Law Group, LLC

(57) ABSTRACT

To securely transmit data from a communication terminal (TC) to an application server (SA) over a telecommunications network (RT), the communication terminal (TC) being connected to the application server (SA) via an unsecure access network (RAns) and being able to communicate with the application server (SA) via at least one secure access network (RAs), the communication terminal (TC) switches the connection with the application server (SA) from the unsecure access network (RAns) to a secure access network (RAs), when personal data (DonP) is likely to be entered or is entered by the user, transmits the personal data (DonP) to the application server (SA) via the secure access network (RAs), and switches the connection with the application server (SA) from the secure access network (RAs) to an unsecure access network (RAns).

9 Claims, 2 Drawing Sheets

(51) Int. Cl.
*H04L 12/28* (2006.01)
*H04W 36/24* (2009.01)

(52) U.S. Cl.
CPC .......... *H04L 63/00* (2013.01); *H04L 63/0428* (2013.01); *H04L 63/06* (2013.01); *H04L 63/105* (2013.01); *H04L 63/18* (2013.01); *H04L 67/02* (2013.01); *H04L 67/32* (2013.01); *H04W 36/24* (2013.01)

(56) References Cited

U.S. PATENT DOCUMENTS

| | | | |
|---|---|---|---|
| 8,533,852 B2* | 9/2013 | Chaudhry | H04L 63/0272 380/243 |
| 8,621,646 B2* | 12/2013 | Chaudhry | H04L 9/3213 380/243 |
| 8,904,521 B2* | 12/2014 | Schneider | H04L 63/1441 709/217 |
| 2002/0099936 A1* | 7/2002 | Kou | H04L 63/0442 713/151 |
| 2003/0110137 A1 | 6/2003 | Armingaud et al. | |
| 2006/0070126 A1 | 3/2006 | Grynberg | |
| 2006/0130132 A1* | 6/2006 | Dharmarajan | H04L 63/0428 726/10 |
| 2007/0244761 A1 | 10/2007 | Scipioni et al. | |
| 2008/0294781 A1* | 11/2008 | Hinton | H04L 63/20 709/227 |
| 2010/0017596 A1 | 1/2010 | Schertzinger | |
| 2010/0031366 A1* | 2/2010 | Knight | G06Q 10/10 726/26 |
| 2010/0130169 A1* | 5/2010 | Narayanaswamy | H04L 63/08 455/411 |
| 2011/0030039 A1 | 2/2011 | Bilange | |
| 2011/0106755 A1* | 5/2011 | Hao | G06F 11/1451 707/610 |
| 2011/0131234 A1* | 6/2011 | Sasai | G06Q 10/00 707/769 |
| 2011/0161234 A1* | 6/2011 | Cuellar | G06Q 20/382 705/75 |
| 2012/0144016 A1* | 6/2012 | Zhang | G06Q 30/02 709/224 |

FOREIGN PATENT DOCUMENTS

| | | |
|---|---|---|
| JP | H1125046 | 1/1999 |
| JP | 2001333126 | 11/2001 |
| JP | 2004062342 | 2/2004 |
| JP | 2008537195 | 9/2008 |
| WO | 01/28154 | 4/2001 |

\* cited by examiner

SECURE DATA TRANSMISSION

TECHNICAL FIELD

The present invention pertains to secure data transmission over telecommunications networks deemed to be at risk.

BACKGROUND

When they are connected to unsecure networks and log into unsecure services, users make it possible for others to access their personal data. For example, when they are connected from a shared access point, in a public place, to a service that does not provide TLS (Transport Layer Security) support, users transmit their logins and passwords without encryption. A malicious user could then easily intercept that data, retrieve the session identifier, and access the user session.

There is therefore a need to reduce such risks whenever a user accesses a service via a telecommunications network.

SUMMARY

To remedy the aforementioned drawbacks, this invention provides a method for transmitting data in a secure manner from a communication terminal of a user to an application server over a telecommunications network, the communication terminal being connected to the application server via a unsecure access network and being capable of communicating with the application server via at least one secure access network, the method comprising the following steps for the communication terminal:

when personal data is likely to be entered by the user and transmitted to the application server, switching the connection with the application server from the unsecure access network to a secure access network, transmitting personal data to the application server via the secure access network, switching the connection with the application server from the secure access network to an unsecure access network.

Advantageously, the system makes it possible to establish a session without disclosing personal data, such as logins and passwords, via the unsecure access network.

According to another characteristic of the invention, the application server can produce a session cookie based on information contained in a request received from the communication terminal and sends the session cookie to the communication terminal, the session cookie comprising limitations on the use of the service provided by the application server during the session.

A user may thereby create a secure session which can be used afterward to access a service via an unsecure network.

According to another characteristic of the invention, the connection with the application server may switch from the secure access network to an unsecure access network after the communication terminal receives the session cookie.

According to another characteristic of the invention, the data entered by the user may be checked, when a webpage hosted by the application server is accessed by the web browser of the communication terminal, and when the communication terminal is connected to the application server via an unsecure access network.

According to another characteristic of the invention, the data entered by the user can be checked during the input of said data or after having been entered during their confirmation by the user in view of being transmitted to the application server.

According to another characteristic of the invention, the entry fields of a webpage accessed by a web browser of the communication terminal that may be completed with personal data can be checked, when the communication terminal is connected to the application server via an unsecure access network.

The invention also pertains to a communication terminal for securely transmitting data from a communication terminal to an application server over a telecommunications network, the communication terminal being connected to the application server via an unsecure access network and being capable of communicating with the application server via at least one secure access network, the communication terminal comprising:

means for switching the connection with the application server from the unsecure access network to a secure access network, when personal data is likely to be entered by the user and transmitted to the application server, means for transmitting personal data to the application server via the secure access network, means for switching the connection with the application server from the secure access network to an unsecure access network.

The invention also pertains to a computer program capable of being implemented within a terminal, said program comprising instructions which, whenever the program is executed within said terminal, carry out the steps according to the inventive method.

BRIEF DESCRIPTION OF THE DRAWINGS

The present invention and the benefits thereof shall be better understood upon examining the description below, which makes reference to the attached figures, in which.

DETAILED DESCRIPTION

Figure 1:
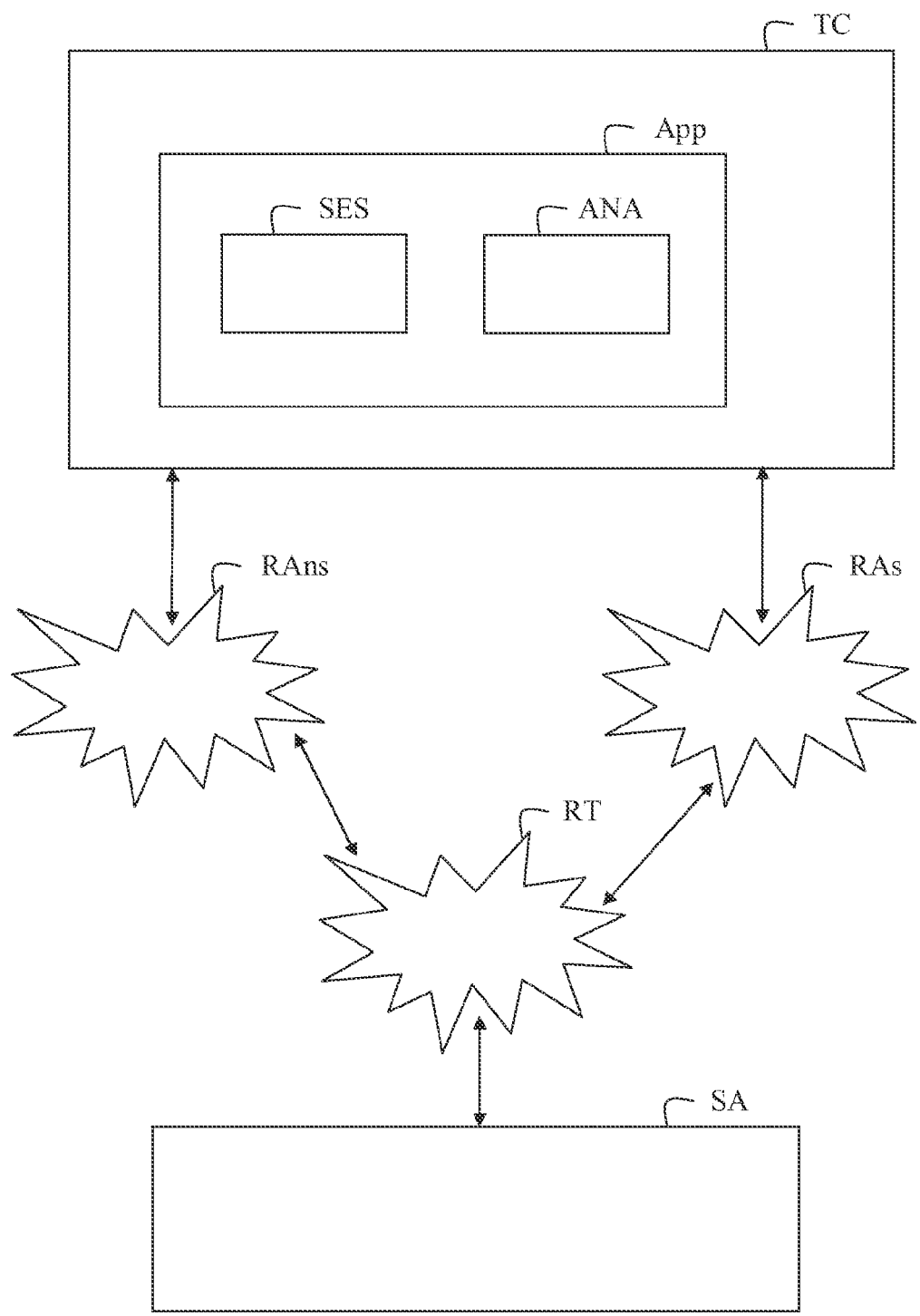
FIG. 1 is a schematic block diagram of a communication system according to one embodiment of the invention.

With reference to FIG. 1, a communication system comprises an application server SA and a communication terminal TC, capable of communicating with one another through a telecommunications network RT.

The telecommunications network RT may comprise wired or wireless networks, or a combination of wired and wireless networks, connected to a high-speed IP packet network in which the application server SA is located.

To give examples, a communication terminal TC may be a laptop personal computer, a tablet, or a mobile cellular radio communication terminal. To give another example, a communication terminal comprises a device or electronic telecommunications object that is personal to the user and which may be a communicating personal digital assistant (PDA) or smartphone.

The telecommunications terminal is capable of being connected to the telecommunications network, for example via an access system of the GSM ("Global System for Mobile communications") or UMTS ("Universal Mobile Telecommunications System") type, and/or via a short-range public wireless network of the WLAN ("Wireless Local Area Network") type, or one that complies with one of the 802.1x standards, or a medium-range wireless network according to the WIMAX protocol ("Worldwide Interoperability Microwave Access").

The communication terminal TC contains an application App, enabling the terminal TC to communicate with the application server SA. According to one example, the application App is contained within a web browser. According to another example, the application App is executed as a proxy in a process running in the background. According to yet another example, the application App is an API (Application Programming Interface) capable of managing a session establishment.

In one variant, the application App is included in another device connected to the communication terminal TC, via a Bluetooth connection, for example.

The application App contains an analysis module ANA and a session module SES.

It is believed that the telecommunications network may comprise one or more access networks RAns said to be unsecure, and one or more access networks RAs said to be secure. An access network said to be unsecure is a network in which the data transmitted has no confidentiality, and in which the data can be intercepted by an entity who is not the intended recipient of the data. Conversely, an access network is said to be secure if it is a network in which the data transmitted has confidentiality, and in which the data cannot be intercepted by an entity who is not the intended recipient of the data. Generally speaking, a network may also have a reputation of being unsecure, that reputation potentially being defined by the user himself or herself, or by the application through an evaluation, for example, of the number of users connected to the network, or by a firewall communicating with the application.

For example, one unsecure access network is a short-range public wireless network of the WLAN or one compliant with one of the 802.1x standards, or a medium-range one based on the WIMAX protocol. The unsecure access network may also be an Ethernet network that does not implement any security protocol or that uses hardware to impede and thereby prevent the interception of the communication (such as by blocking off communications with a switch).

For example, a secure access network is a GSM or UMTS cellular network. The unsecure access network can also be an Ethernet network implementing a security protocol.

It is also assumed that the secure access network has less bandwidth than the unsecure access network, or that the quantity of data that the user can transport across it is less. A user who is already connected via an unsecure access network with a large bandwidth can transmit personal data via an unsecure access network, even if that network has limited bandwidth, and can use the unsecure access network again more quickly in order to use a given service.

It is also assumed that the user wants to transmit personal data which is private, secret, or confidential data. For example, personal data contains a login, a password, or contact information about the user such as his or her name, mailing address, e-mail address, or telephone number.

The analysis module ANA of the application monitors the type of data transmitted and to be transmitted from the communication terminal TC through the telecommunications network. When the terminal is connected to an application server SA via an unsecure network, the analysis module ANA sends an alert whenever a website requires the transmission of sensitive data, such as a password. For example, the analysis module ANA can explore the code of the current web page in order to detect personal data entry fields or can detect in real time the entry of personal data by the user before it is confirmed. Furthermore, the user can himself or herself indicate to the application a set of data that he or she considers to be personal data.

Whenever the analysis module ANA sends an alert, detecting that personal data is about to be transmitted via an unsecure network, the analysis module ANA triggers the session module SES to switch the connection to a secure network.

According to one embodiment, if the analysis module ANA notices that a webpage contains entry fields likely to be related to personal data, such as a field related to entering a login, but the user does not enter personal data previously defined by him or her, such as a fake login, the analysis module ANA cannot trigger the session module SES to change the network.

The session module SES can be configured by the user to indicate what type of session must be established, and what permissions are granted for the session. A session may thereby have the following limitations for a service provided by the application server.

read only (the session cannot change the users profile),
update only (to only read the information published by the service since the last update, for example in order to read only the latest emails that have not yet been read),
short session lifespan,
session linked to the IP address (which assumes that the communication terminal knows its own public IP address),
other limitations specific to the service (for example, a limited number of location updates).

According to one embodiment, the session module SES can prevent the web browser from accepting a session cookie that is not being transmitted via a secure connection.

Such limitations are defined in a connection indicator or a session cookie related to the service by the application server SA upon request from the session module SES. The communication terminal TC then receives the cookie via the secure connection and the session module SES can switch the connection back to an unsecure network. From the browsers perspective, no additional operations are required because the cookie is not affected by the connectivity of the communication terminal.

The session cookie with such limits also makes it possible to inform the application server SA that the next exchanges with the communication terminal TC will be performed via an unsecure connection.

Figure 2:
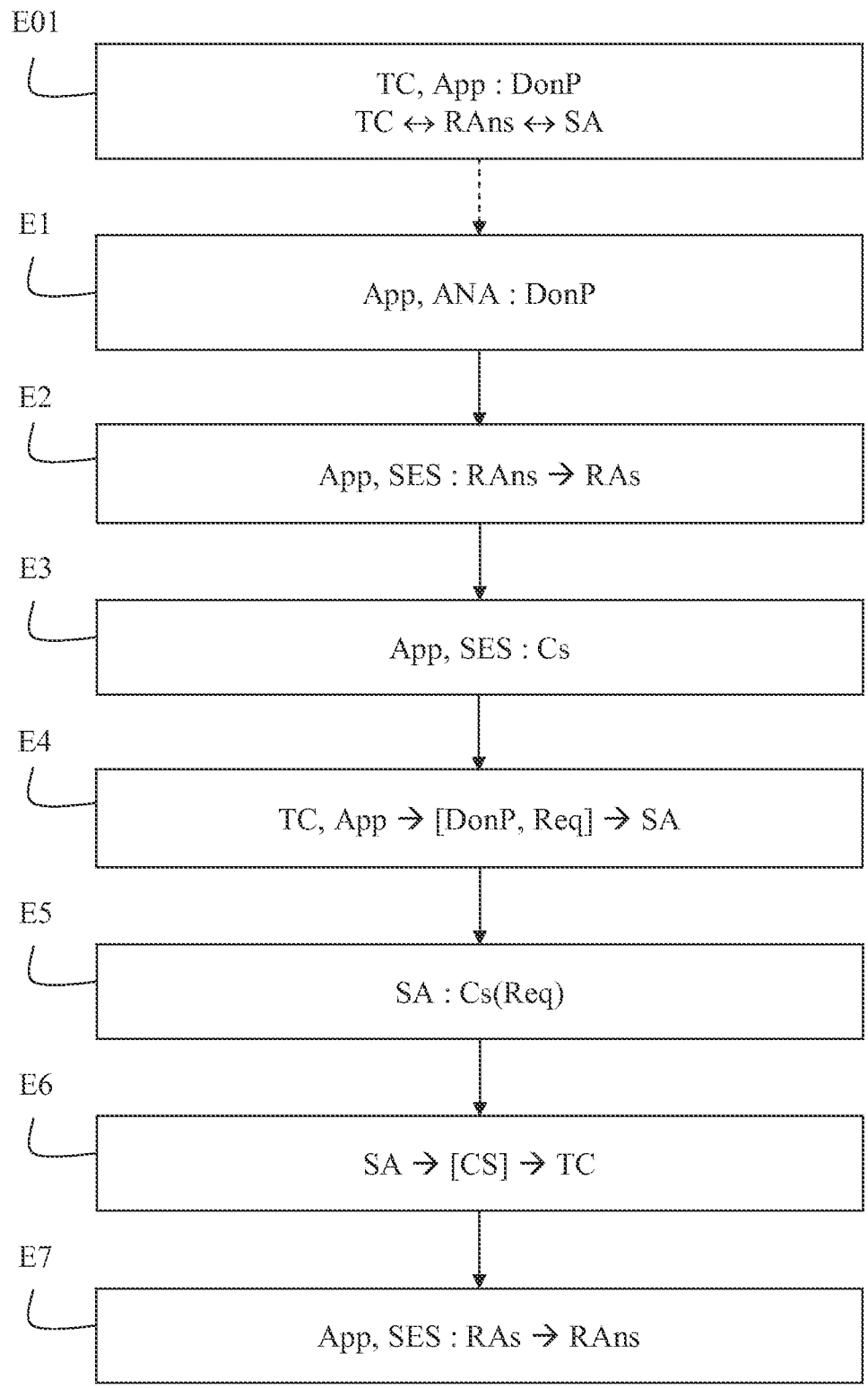
FIG. 2 is an algorithm of a method for secure data transmission according to one embodiment of the invention.

With reference to FIG. 2, a method for secure data transmission according to one embodiment of the invention comprises steps E1 to E6 executed within the communications system.

In a preliminary step E01, the user optionally defines a set of personal data DonP by means of the application App implemented within the communication terminal TC.

The user then connects to the application server SA via the communication terminal TC1. The communication terminal TC receives a first cookie called the connection cookie, enabling the web browser to save the identifier of the application server SA. It is assumed that the communication terminal TC is connected to the application server SA via an unsecure access network RAns.

In step E1, the analysis module ANA of the application App controls the data entered by the user and to be transmitted from the communication terminal TC to the application server SA over the telecommunications network, whenever a webpage hosted by the application server is accessed by the web browser of the terminal. The analysis module ANA of the application App additionally checks the input fields of a webpage, hosted by the application server and accessed by the web browser of the terminal, which are likely to be completed with personal data. Since the terminal is connected to the application server SA via an unsecure access network, the analysis module ANA sends an alert when personal data DonP is likely to be entered by the user and transmitted to the application server. For this reason, an alert can be sent in three cases:

- when personal data DonP is likely to be entered by the user but has not yet been entered, once the application accesses the webpage,
- when the user is entering personal data DonP or once the user has finished entering personal data DonP identified as such.
- when the user confirms personal data DonP that he or she entered to transmit, and that personal data DonP is about to be transmitted to the application server.

In step E2, the session module SES switches the connection with the application server SA from the unsecure access network RAns to a secure access network RAs, if the latter exists. To that end, the analysis module ANA identifies the various available secure access networks, and selects one of them according to predefined criteria, based for example on user preferences and technical characteristics of the access network. The connection with the application server SA is not interrupted for the user because the web browser can use the first cookie, the connection cookie, to communicate with the application server SA.

In step E3, the session module SES prompts the user to define limitations for one or more subsequent sessions between the communication terminal TC and the application server SA. Such limitations indicate permissions granted for said subsequent sessions.

Such limitations are to be transmitted upon request from the session module SES to the application server SA so that the latter can produce a connection indicator or session cookie Cs that takes those limitations into account.

According to one embodiment, the order of steps E2 and E3 can be reversed.

In step E4, the application App authorizes the transmission of personal data DonP to the application server SA via the secure access network RAs and transmits a request Req containing limitations for a session cookie.

In step E5, the application server SA receives personal data DonP and the request Req. The server SA produces a session cookie Cs based on the information contained in the received request Req.

In step E6, the application server SA transmits the session cookie Cs to the communication terminal TC.

In step E7, the session module SES detects the receipt of the session cookie Cs and switches the connection with the application server SA from the secure access network RAs to an unsecure access network RAns, which can be the initial unsecure access network.

Steps E1 to E7 can be repeated. During a first iteration of the steps, the personal data DonP may be a user identifier and a password, making it possible to authenticate the user with a website hosted by the application server SA. Once authenticated, the user can interact with the website within the limits of the permissions included in the session cookie, as the application App is still monitoring personal data likely to be transmitted via the unsecure access network, such as private information like a name or address.

The invention described here pertains to a method and terminal for secure data transmission. According to one embodiment of the invention, the steps of the inventive method are determined by the instructions of a computer program incorporated into a terminal, such as the communication terminal TC, the program dictating the behavior of at least one software application such as the application App. The program comprises program instructions that, when said program is loaded and executed within the terminal, carry out the steps of the inventive method.

Consequently, the invention also applies to a computer program, particularly a computer program on or within an information medium, suitable to implement the invention. This program may use any programming language, and be in the form of source code, object code, or intermediate code between source code and object code, such as in a partially compiled form, or in any other form desirable for implementing the inventive method.

The invention claimed is:

1. A method for transmitting data from a communication terminal of a user, comprising the steps of:
   when personal data is likely to be transmitted, switching a connection from an unsecure access network to a secure access network;
   transmitting a request for a session cookie from the communication terminal of the user via the secure access network, wherein the request for the session cookie comprises the personal data;
   switching the connection from the secure access network to the unsecure access network; and
   receiving a session cookie over the secure access network in response to information contained in the request for a session cookie, the session cookie identifying limitations on a use of a service provided during a session.

2. The method of claim 1, wherein the connection switches from the secure access network to an unsecure access network after receiving the session cookie.

3. The method of claim 1, further comprising the step of checking entered data, when a web browser of the communication terminal communicates via an unsecure access network.

4. The method of claim 3, wherein the entered data can be checked during the input of the entered data or during the confirmation of the entered data after having been entered.

5. The method of claim 1, further comprising the step of detecting personal data entry fields, when a web browser of the communication terminal accesses a webpage via an unsecure access network.

6. The method of claim 1, wherein acceptance of the session cookie is rejected when the session cookie is not received over the secure access network.

7. The method of claim 1, wherein the connection over the unsecure access network is maintained when the personal data likely to be transmitted is not previously defined personal data.

8. A non-transitory digital data storage medium encoding a machine-executable program of instructions to perform a method when the program is loaded and executed in a communication terminal of a user, the method comprising the steps of:
   when personal data is likely to be transmitted, switching a connection from an unsecure access network to a secure access network;
   transmitting a request for a session cookie from the communication terminal of the user via the secure access network, wherein the request for the session cookie comprises the personal data;
   switching the connection from the secure access network to the unsecure access network; and
   receiving a session cookie over the secure access network in response to information contained in the request for a session cookie, the session cookie identifying limitations on a use of a service provided during a session.

9. A communication terminal of a user for transmitting data, the communication terminal of the user comprising:
an analysis module that detects when personal data is likely to be transmitted; and
a session module that switches a connection from an unsecure access network to a secure access network in response to the analysis module detecting when personal data is likely to be transmitted, and switches from the secure access network to the unsecure access network when a session cookie is received over the secure access network,
wherein the session cookie is received in response to a session cookie request transmitted from the communication terminal of the user over the secure access network, wherein the session cookie request comprises the personal data.

* * * * *